(12) United States Patent
Mandler et al.

(10) Patent No.: US 7,437,363 B2
(45) Date of Patent: Oct. 14, 2008

(54) USE OF SPECIAL DIRECTORIES FOR ENCODING SEMANTIC INFORMATION IN A FILE SYSTEM

(75) Inventors: Benjamin Mandler, Zichron Yaakov (IL); Roman Talyansky, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1470 days.

(21) Appl. No.: 09/929,260

(22) Filed: Aug. 15, 2001

(65) Prior Publication Data
US 2002/0097278 A1    Jul. 25, 2002

Related U.S. Application Data

(60) Provisional application No. 60/264,519, filed on Jan. 25, 2001.

(51) Int. Cl.
*G06F 17/30* (2006.01)
(52) U.S. Cl. ............... 707/10; 707/7; 707/1; 707/3
(58) Field of Classification Search .......... 707/1–3, 707/7–10; 705/7, 10
See application file for complete search history.

(56) References Cited

U.S. PATENT DOCUMENTS

| 2001/0049675 A1* | 12/2001 | Mandler et al. ............... 707/1 |
| 2003/0229537 A1* | 12/2003 | Dunning et al. ............... 705/10 |
| 2004/0215600 A1* | 10/2004 | Aridor et al. .................. 707/3 |
| 2004/0230461 A1* | 11/2004 | Talib et al. ..................... 705/7 |

OTHER PUBLICATIONS

U.S. Appl. No. 09/873,084, filed Jun. 4, 2001.
XML Path Language (Xpath), Version 1.0. W3C®, http://www.w3.org/TR/1999/REC-xpath-19991116.

* cited by examiner

*Primary Examiner*—Sana Al-Hashemi
(74) *Attorney, Agent, or Firm*—Browdy and Neimark P.L.L.C (57) ABSTRACT

In an enhanced file system specialized operators are provided, which consolidate contextually sensitive selections of documents from widely scattered sources in a concise presentation, such as a linear list. One specialized operator, _desc, converts a hierarchical tree into a single level, and provides an exhaustive list of the directories of documents that are distributed throughout the tree. Another specialized operator, _star, provides a single level presentation, such as a linear list, of the child elements of its contextual node. The specialized operators are invoked by opening special directories that are presented to the user in a conventional file system interface.

12 Claims, 9 Drawing Sheets

USE OF SPECIAL DIRECTORIES FOR ENCODING SEMANTIC INFORMATION IN A FILE SYSTEM

CROSS-REFERENCE TO RELATED APPLICATIONS

This application claims the benefit of Provisional Application No. 60/264,519, filed Jan. 25, 2001.

BACKGROUND OF THE INVENTION

1. Field of the Invention

This invention relates to computer file systems. More particularly this invention relates to an improved semantically based file system, in which semantic information is encoded in the names of virtual directories.

2. Description of the Related Art

It has been recognized that static, hierarchical systems of organizing documents are inadequate to efficiently meet the needs of computer users attempting to access increasingly vast amounts of dynamically changing information. Conventional file systems are simply too unwieldy to deal with this information load in a way that is convenient to the user. They have become increasingly impractical for efficient document management. In providing component names for the user, conventional file systems thereafter attach no semantic significance to the identified names. Consequently, they are largely limited to a familiar set of functions e.g., creating a physical directory structure, storing files in a specific directory location, and retrieving the files from the same location.

SUMMARY OF THE INVENTION

It is a primary advantage of some aspects of the present invention that the functionality of a computer file system is enhanced by the attachment of additional semantic information to directory names.

It is another advantage of some aspects of the present invention that the enhanced functionality is made available within the user's normal file system environment.

It is a further advantage of some aspects of the present invention that the file system provided is interoperable with existing computer applications that utilize the computer system's applications programming interface (API).

These and other advantages of the present invention are attained by a file system, which presents a dynamic directory structure to the user, and breaks the conventional tight linkage between sets of files and the physical directory structure, thus allowing different users to see files organized in a different fashion. The present invention provides specialized operators that consolidate contextually sensitive selections of documents from widely scattered sources in a concise presentation, such as a linear list. One specialized operator, _desc, converts a hierarchical tree into a single level, and provides an exhaustive list of the elements and attributes of documents that are distributed throughout the tree. Another specialized operator, _star, provides a single level presentation, such as a linear list, of the child elements of its contextual node. The operator _star applies to the directory's immediate children, similar to a "wild card". Thus, the application of the operator _star on a particular directory results in the display of that directory's grandchildren. The specialized operators are invoked by opening special directories that are presented to the user in a conventional file system interface.

In copending application Ser. No. 09/873,084, filed Jun. 4, 2001, under attorney docket number 40394, of common assignee herewith, and herein incorporated by reference, a semantic file system is disclosed which exploits attributes encoded in an XML document. The file system presents a dynamic directory structure to the user, and breaks the conventional tight linkage between sets of files and the physical directory structure, thus allowing different users to see files organized in a different fashion. The dynamic structure is based upon content, which is extracted according to attributes defined by the XML structure. To the user, the XML-aware file system appears to be a completely conventional standard file system, and it supports any existing application that employs a standard file system applications programming interface. In addition, in some embodiments, since the XML-aware file system is built upon an existing file system, it can exploit existing support facilities, for example backup facilities.

In an important departure from the view presented by traditional hierarchical file systems, instead of showing files organized in a static directory structure, the XML-aware file system shows files organized in a dynamic hierarchy which is constructed on-the-fly. The user of the XML-aware file system is informed by the directory path as to relevant content at a particular instance in time. A directory path in the XML-aware file system is a sequence of attributes and values, and the contents of a directory are all of the XML documents that have the attributes and values named in the path. In other words, a directory path in the XML-aware file system reflects a query for a set of documents matching a set of constraints. As the path is being incrementally constructed, the user of the file system browses through a set of documents that match a partial query.

In an exemplary embodiment, the specialized operators can be implemented in the XML-aware file system that is disclosed in the above noted copending application. The specialized operators enhance the XML-aware file system, enriching it by providing improved semantic operations that result in enhanced functionality and presentation of meaningful links to files that may be desired by the user.

The invention provides a computer implemented method of information retrieval using a file system, including the steps of displaying a portion of a hierarchical tree that is representative of a repository of memorized files. The method further includes displaying a special virtual directory in each of the directories and the subdirectories of the hierarchical tree, invoking a semantic operator by selection of the special virtual directory, and displaying elements of at least a subtree of the hierarchical tree, the elements being selected by the semantic operator.

An aspect of the method includes arranging a screen display in accordance with a specification of the semantic operator.

According to an aspect of the method, the semantic operator is _desc.

According to an aspect of the method, the semantic operator is _star.

According to an additional aspect of the method, the repository of memorized files includes documents written in a markup language.

The invention provides a computer software product, including a computer-readable medium in which computer program instructions are stored, which instructions, when read by a computer, cause the computer to perform the steps of displaying a portion of a hierarchical tree that is representative of a repository of memorized files, levels of the hierarchical tree including directories and subdirectories thereunder, and displaying a special virtual directory in each of the directories and the subdirectories. The steps further include invoking a semantic operator by selection of the special virtual directory, displaying elements of at least a subtree of the hierarchical tree, the elements being selected by the semantic operator.

An aspect of the computer software product includes arranging a screen display in accordance with a specification of the semantic operator.

According to yet another aspect of the computer software product, the semantic operator is _desc.

According to still another aspect of the computer software product, the semantic operator is _star.

According to one aspect of the computer software product, the repository of memorized files includes documents written in a markup language.

The invention provides a computer implemented information retrieval system for presenting a semantically dependent directory structure of files to a user, including a file system engine that receives a file request via a file system application programming interface, and issues file system calls to an operating system. The file request specifies a file content of memorized files, wherein responsive to the file request, the file system engine returns a hierarchical tree of directories to the file system application programming interface, the directories having references to selected ones of the memorized files. The file system engine displays a special virtual directory in each of the directories, wherein the special virtual directory includes at least a portion of the hierarchical tree, the portion being selected by a semantic operator.

An aspect of the information retrieval system includes a monitor, which has a screen display arranged thereon in accordance with a specification of the semantic operator.

According to a further aspect of the information retrieval system, the semantic operator is _desc.

According to yet another aspect of the information retrieval system, the semantic operator is _star.

According to still another aspect of the information retrieval system, the memorized files comprise documents written in a markup language.

According to an additional aspect of the information retrieval system, the markup language is XML.

The invention provides a computer implemented method of information retrieval, including the steps of retrieving structural information of memorized documents according to a document type declaration that corresponds to each of the documents, retrieving elements, attributes and values of the elements and the attributes of the documents, generating a multilevel inverted index from the structural information, the elements, the attributes and the values, accepting a specification from a user, wherein the specification has members that comprise at least one of the elements, the attributes and the values. Responsive to the specification, the method includes extracting data from the multilevel inverted index that complies with at least one of the members of the specification, and displaying a hierarchical tree. Levels of the hierarchical tree include directories, wherein the directories each comprise a sequence of the members, and wherein contents of the directories and contents of subdirectories thereunder comprise selected ones of the documents possessing the specification. The method further includes displaying a special virtual directory in each of the directories, wherein content of the special virtual directory includes at least one level of the hierarchical tree, which is more deeply nested than the level of the special virtual directory in the hierarchical tree.

An aspect of the method includes invoking an operator _desc to a context node of the special virtual directory.

A further aspect of the method invoking the operator _desc also includes selecting all descendants of the context node, and displaying a list of the descendants.

According to one aspect of the method, the list is a linear list.

Another aspect of the method displaying the special virtual directory includes invoking an operator _star to a context node of the special virtual directory.

A further aspect of invoking the operator _star includes selecting all children of the context node, and displaying a list of grandchildren of the context node.

According to still another aspect of the method, the children are selected from the elements.

According to an additional aspect of the method, the children comprise selected ones of the elements, the attributes, and the values.

According to one aspect of the method, the multilevel inverted index includes a structural section that has postings of the structural information, and a words section that has postings of the values, wherein the values are words.

According to another aspect of the method, the documents are XML documents.

A further aspect of the method includes noting changes in a composition of a repository of the documents, and updating the multilevel inverted index responsive to the changes.

The invention provides a computer implemented method of information retrieval, including the steps of retrieving structural information of memorized documents according to a document type declaration that corresponds to each of the documents, wherein the documents are written in a markup language, retrieving elements, attributes and values of the elements and the attributes of the documents, generating a multilevel inverted index from the structural information, the elements, the attributes and the values, accepting a specification from a user. The specification has members that comprise at least one of the elements, the attributes and the values, responsive to the specification. The method includes extracting data from the multilevel inverted index that complies with at least one of the members, displaying a hierarchical tree, levels of the hierarchical tree including directories, wherein the directories each comprise a sequence of the members, and wherein contents of the directories and contents of subdirectories thereunder comprise selected ones of the documents possessing the specification, and displaying a special virtual directory in each of the directories, wherein content of the special virtual directory includes at least one level of the hierarchical tree, the one level being more deeply nested than the level of the special virtual directory in the hierarchical tree.

An aspect of displaying the special virtual directory includes invoking an operator _desc to a context node of the special virtual directory.

Another aspect of the method invoking the operator _desc also includes selecting all descendants of the context node, and displaying a list of the descendants.

According to a further aspect of the method, the list is a linear list.

Yet another aspect of the method displaying the special virtual directory includes invoking an operator _star to a context node of the special virtual directory.

An aspect of invoking the operator _star includes selecting all children of the context node, and displaying a list of grandchildren of the context node.

According to one aspect of the method, the children are selected from the elements.

According to another aspect of the method, the children comprise selected ones of the elements, the attributes, and the values.

According to a further aspect of the method, the multilevel inverted index includes a structural section that has postings of the structural information, and a words section that has postings of the values, wherein the values are words.

According to yet another aspect of the method, the documents are XML documents.

Still another aspect of the method includes noting changes in a composition of a repository of the documents, and updating the multilevel inverted index responsive to the changes.

The invention provides a computer software product, including a computer-readable medium in which computer program instructions are stored, which instructions, when read by a computer, cause the computer to perform the steps of retrieving structural information of memorized documents according to a document type declaration that corresponds to each of the documents, retrieving elements, attributes and values of the elements and the attributes of the documents, generating a multilevel inverted index from the structural information, the elements, the attributes and the values. The steps include accepting a specification from a user having members that comprise at least one of the elements, the attributes and the values, extracting data from the multilevel inverted index that complies with at least one of the members, displaying a hierarchical tree, levels of the hierarchical tree including directories, wherein the directories each comprise a sequence of the members, and wherein contents of the directories and contents of subdirectories thereunder comprise selected ones of the documents possessing the specification. The steps include displaying a special virtual directory in each of the directories, wherein content of the special virtual directory includes at least one level of the hierarchical tree, the one level being more deeply nested than the level of the special virtual directory in the hierarchical tree.

In an aspect of the computer software product, the steps include invoking an operator _desc to a context node of the special virtual directory.

In one aspect of the computer software product, the steps include invoking the operator _desc, selecting all descendants of the context node, and displaying a list of the descendants.

According to another aspect of the computer software product, the list is a linear list.

A further aspect of the computer software product includes invoking an operator _star to a context node of the special virtual directory.

In yet another aspect of the computer software product invoking the operator _star also includes selecting all children of the context node, and displaying a list of grandchildren of the context node.

According to still another aspect of the computer software product, the list is a linear list.

According to an additional aspect of the computer software product, the children are selected from the elements.

According to one aspect of the computer software product, the children comprise selected ones of the elements, the attributes, and the values.

According to another aspect of the computer software product, the multilevel inverted index includes a structural section that has postings of the structural information, and a words section that has postings of the values, wherein the values are words.

According to a further aspect of the computer software product, the documents are XML documents.

In yet another aspect of the computer software product the instructions further cause the computer to perform the steps of noting changes in a composition of a repository of the documents, and updating the multilevel inverted index responsive to the changes.

The invention provides a computer software product, including a computer-readable medium in which computer program instructions are stored, which instructions, when read by a computer, cause the computer to perform the steps of retrieving structural information of memorized documents according to a document type declaration that corresponds to each of the documents, wherein the documents are written in a markup language, retrieving elements, attributes and values of the elements and the attributes of the documents, generating a multilevel inverted index from the structural information, the elements, the attributes and the values, accepting a specification from a user that has members that comprise at least one of the elements, the attributes and the values, and, responsive to the specification, extracting data from the multilevel inverted index that complies with at least one of the members. The steps include displaying a hierarchical tree, levels of the hierarchical tree including virtual directories, wherein the virtual directories each comprise a sequence of the members, and wherein contents of the virtual directories and contents of virtual subdirectories thereunder comprise selected ones of the documents possessing the specification. The steps including displaying a special virtual directory in each of the virtual directories, wherein content of the special virtual directory includes at least one level of the hierarchical tree, the one level being more deeply nested than the level of the special virtual directory in the hierarchical tree.

In an aspect of the computer software product, displaying the special virtual directory includes invoking an operator _desc to a context node of the special virtual directory.

In an additional aspect of the computer software product invoking the operator, _desc also includes selecting all descendants of the context node, and displaying a list of the descendants.

According to one aspect of the computer software product, the list is a linear list.

In another aspect of the computer software product displaying the special virtual directory includes invoking an operator _star to a context node of the special virtual directory.

In a further aspect of the computer software product invoking the operator _star also includes selecting all children of the context node, and displaying a list of grandchildren of the context node.

According to yet another aspect of the computer software product, the list is a linear list.

According to still another aspect of the computer software product, the children are selected from the elements.

According to an additional aspect of the computer software product, the children comprise selected ones of the elements, the attributes, and the values.

According to one aspect of the computer software product, the multilevel inverted index includes a structural section has postings of the structural information, and a words section has postings of the values, wherein the values are words.

According to another aspect of the computer software product, the documents are XML documents.

In a further aspect of the computer software product the instructions further cause the computer to perform the steps of noting changes in a composition of a repository of the documents, and updating the multilevel inverted index responsive to the changes.

The invention provides a computer implemented information retrieval system for presenting a semantically dependent directory structure of files to a user, including a file system engine, that receives a file request via a file system application programming interface, and issues file system calls to an operating system, wherein the file request specifies a file content of memorized files. The files comprise documents written in a markup language. The system includes a parser linked to the file system engine that retrieves structural information of the documents, the parser further retrieving at least one of elements, attributes and respective values thereof from the documents. The system includes an indexer, linked to the parser, for constructing an inverted index of the elements and the attributes and the respective values thereof, wherein responsive to the file request, the file system engine retrieves postings of the inverted index that satisfy requirements of the file request, and returns a hierarchical tree of directories to the file system application programming interface, the directories having references to selected ones of the documents corresponding to the postings. The file system engine displays a special virtual directory in each of the directories, wherein content of the special virtual directory includes at least one level of the hierarchical tree, the one level being more deeply nested than the level of the special virtual directory in the hierarchical tree.

According to an aspect of the information retrieval system, the file system engine displays the special virtual directory by invoking an operator _desc to a context node of the special virtual directory.

According to another aspect of the information retrieval system, the file system engine displays the special virtual directory by the steps of selecting all descendants of the context node, and displaying a list of the descendants.

According to a further aspect of the information retrieval system, the list is a linear list.

According to yet another aspect of the information retrieval system, the file system engine displays the special virtual directory by invoking an operator _star to a context node of the special virtual directory.

In still another aspect of the information retrieval system the file system engine displays the special virtual directory by the steps of selecting all children of a context node of the special virtual directory, and displaying a list of grandchildren of the context node.

According to an additional aspect of the information retrieval system, the list is a linear list.

According to one aspect of the information retrieval system, the children are selected from the elements.

According to another aspect of the information retrieval system, the children comprise selected ones of the elements, the attributes, and the values.

According to yet another aspect of the information retrieval system, the inverted index includes a structural section that has postings of the structural information, and a words section that has postings of words of the documents.

Still another aspect of the information retrieval system includes an analyzer for updating the inverted index, wherein the analyzer analyzes additions to the memorized files.

According to an additional aspect of the information retrieval system, the parser retrieves the structural information from document type declarations of the documents.

The invention provides a computer implemented information retrieval system for presenting a semantically dependent directory structure of XML files to a user, including a file system engine, which receives a file request via a file system application programming interface and issues file system calls to an operating system, wherein the file request specifies a file content of memorized files. The system includes an XML parser linked to the file system engine, which retrieves structural information of XML documents, the XML parser further retrieving at least one of elements, attributes and respective values thereof from the XML documents. The system includes an indexer, linked to the XML parser, for constructing an inverted index of the elements and the attributes and the respective values thereof, wherein responsive to the file request, the file system engine retrieves postings of the inverted index that satisfy requirements of the file request, and returns a hierarchical tree of virtual directories to the file system application programming interface, the virtual directories having references to selected ones of the XML documents corresponding to the postings. The file system engine displays a special virtual directory in each of the virtual directories, wherein content of the special virtual directory includes at least one level of the hierarchical tree, the one level is more deeply nested than the level of the special virtual directory in the hierarchical tree.

According to an aspect of the information retrieval system, the file system engine displays the special virtual directory by invoking an operator _desc to a context node of the special virtual directory.

In still another aspect of the information retrieval system, the file system engine displays the special virtual directory by selecting all descendants of the context node, and displaying a list of the descendants.

According to an additional aspect of the information retrieval system, the list is a linear list.

According to one aspect of the information retrieval system, the file system engine displays the special virtual directory by invoking an operator _star to a context node of the special virtual directory.

In another aspect of the information retrieval system, the file system engine displays the special virtual directory by selecting all children of the context node of the special virtual directory, and displaying a list of grandchildren of the context node.

According to a further aspect of the information retrieval system, the list is a linear list.

According to yet another aspect of the information retrieval system, the children are selected from the elements.

According to still another aspect of the information retrieval system, the children comprise selected ones of the elements, the attributes, and the respective values.

According to an additional aspect of the information retrieval system, the inverted index includes a structural section that has postings of the structural information, and a words section that has postings of words of the XML documents.

One aspect of the information retrieval system includes an XML analyzer for updating the inverted index, wherein the XML analyzer analyzes additions to the memorized files.

According to another aspect of the information retrieval system, the XML parser retrieves the structural information from document type declarations of the XML documents.

BRIEF DESCRIPTION OF THE DRAWINGS

For a better understanding of these and other objects of the present invention, reference is made to the detailed description of the invention, by way of example, which is to be read in conjunction with the following drawings, wherein.

DESCRIPTION OF THE PREFERRED EMBODIMENT

In the following description, numerous specific details are set forth in order to provide a thorough understanding of the present invention. It will be apparent however, to one skilled in the art that the present invention may be practiced without these specific details. In other instances well-known circuits, control logic, and the details of computer program instructions for conventional algorithms and processes have not been shown in detail in order not to unnecessarily obscure the present invention.

Software programming code, which embodies aspects of the present invention, is typically maintained in permanent storage, such as a computer readable medium. In a client/server environment, such software programming code may be stored on a client or a server. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. The techniques and methods for embodying software program code on physical media and distributing software code via networks are well known and will not be further discussed herein. The invention may be practiced using a general purpose computer having conventional facilities, for example a screen display.

While the teachings of the invention are disclosed with reference to an XML-aware file system, the invention is not limited to XML documents. It can be applied, for example, to documents written in other markup languages, and to other types of files from which contextual attributes either are encoded or can be derived. Moreover, there are numerous applications written for the file system applications programming interface. Those applications can operate with the present invention without any modifications whatsoever. It will occur to those skilled in the art that the teachings of the invention can be implemented in diverse file systems other than those specifically disclosed herein.

Figure 1:
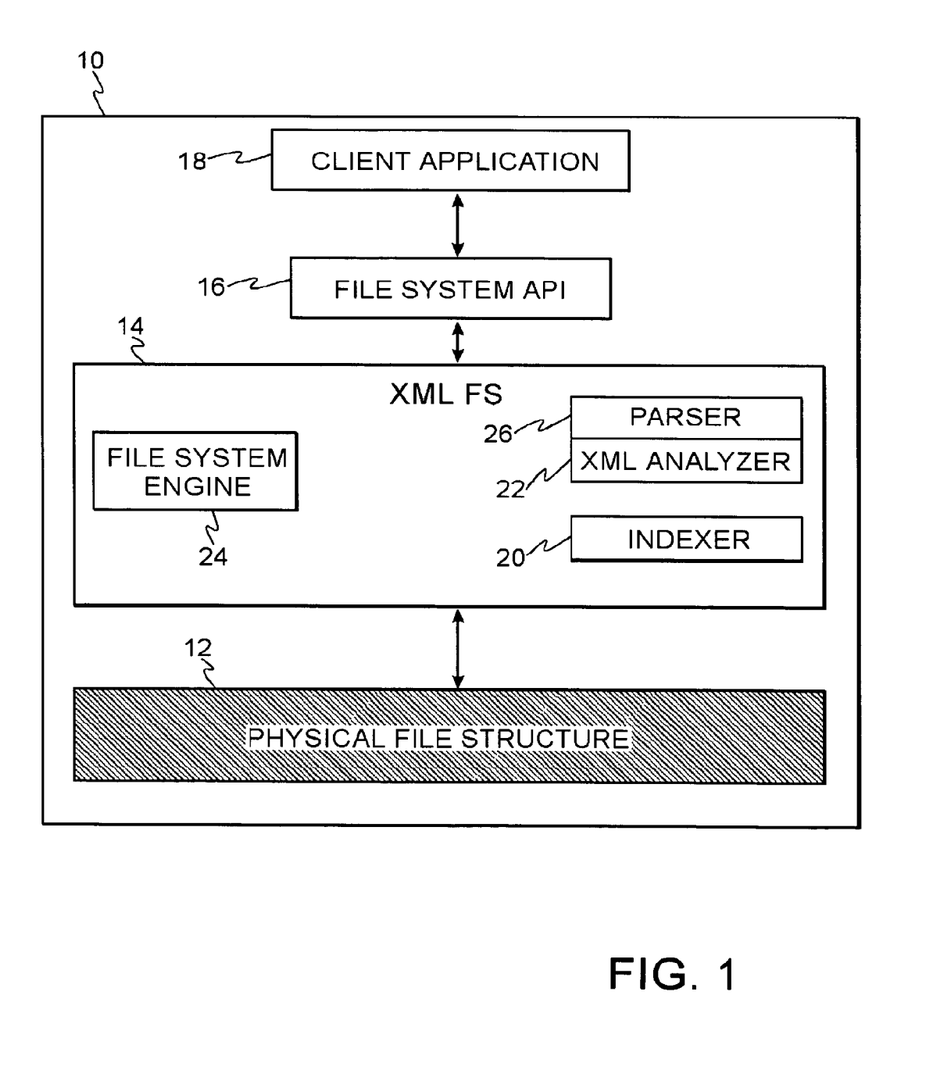
FIG. 1 is a block diagram of an XML-aware file system, which is operative in accordance with a preferred embodiment of the invention.

Turning now to the drawings, reference is made to FIG. 1, which displays a high level block diagram of an exemplary file system, which is constructed and operative in accordance with a preferred embodiment of the invention. An arrangement 10 allows a computer user to access stored data. The arrangement 10 is fully disclosed in above noted copending application. However, a brief explanation is presented herein, in order to facilitate understanding of the teachings of the present invention. In the arrangement 10, there is a basic underlying physical file structure 12, which is conventional. The file structure 12 can be realized by a physical file system. An XML-aware file system 14 forms a functional layer between the file structure 12 and the file system applications programming interface 16 that is seen by a user application 18. Shielded by the file system applications programming interface 16, the XML-aware file system 14 presents itself to the outside world in a completely standard fashion.

The XML-aware file system 14 has several components that cooperate to provide a file system applications programming interface for accessing files in a context-sensitive manner. These components include an indexer 20, an XML analyzer 22, and a file system engine 24.

The indexer 20 produces a multilevel inverted index that can support several kinds of queries. Queries that are supported include supplying all valid values in a given context, including child elements, attributes, and actual values from the files stored in the repository. An example of this type of query is, "Supply all possible values of the context /profile/name". In other words, supply all child elements and attributes of the element "name", and all the values of this element from the files themselves.

Another supported query is a request to supply all files that have a particular value in a given context. An example is the query, "Supply all the files which have the word INC in the context /profile/name".

The conjunction of several queries is supported, for example the query "/profile/name/INC/and/profile/ticker". This query will supply all valid values in the context /profile/ticker from all the files which have the word INC in their /profile/name element.

The XML analyzer 22 is responsible for updating the index created by the indexer 20 when newer files appear in the file structure 12, which is the repository of the documents. The file system engine 24 implements basic file system functions, and may do this by building upon an existing file system, for example by issuing basic file system calls to the operating system. A main difference of the file system engine 24, as compared with a conventional file system engine, is the consultation of the indexer 20 when information about the directory structure is required. This occurs, for example, when reading, or traversing directories. The file system engine 24 receives instructions from the file system applications programming interface 16. It then passes a directory path to the indexer 20, which interprets the path as a query. The indexer 20 returns information which enables the file system engine 24 to respond to the file system applications programming interface 16 as if a conventional directory were accessed.

The XML-aware file system 14 adapts the concept of semantic file systems, which is proposed in the above noted document, Semantic File Systems, and uses it in combination with information retrieval techniques in the context of XML documents. Semantic file systems attempt to gather underlying semantics of the files, and present the files to the users in virtual directories that are organized according to the file semantics in order to ease navigation. The XML-aware file system 14 exploits the file content to derive metadata, which is, needed in order to automatically and semantically organize the files. In order to derive the metadata, each file that is added to the file structure 12 has to be parsed in order to retrieve meaningful information that makes the search functions and browse functions of an XML document repository possible. The XML-aware file system 14 uses an XML-parser 26, which is associated with the XML analyzer 22. The XML-parser 26 retrieves the underlying structural information of an XML document, as well as individual elements and attributes, together with their respective values. A conventional IBM parser, XML4J, is suitable. This structural information, which is an integral part of the document according to well-known XML specifications, is used by the indexer 20 to construct an inverted index that supports automatic meaningful organization of documents by content. This process is completely automatic and transparent to the user.

In the currently preferred embodiment, the components of the XML-aware file system 14 are written in Java. However, many programming languages could be equally applied. A prototype system currently operates under the Microsoft Windows® Operating System.

Figure 2:
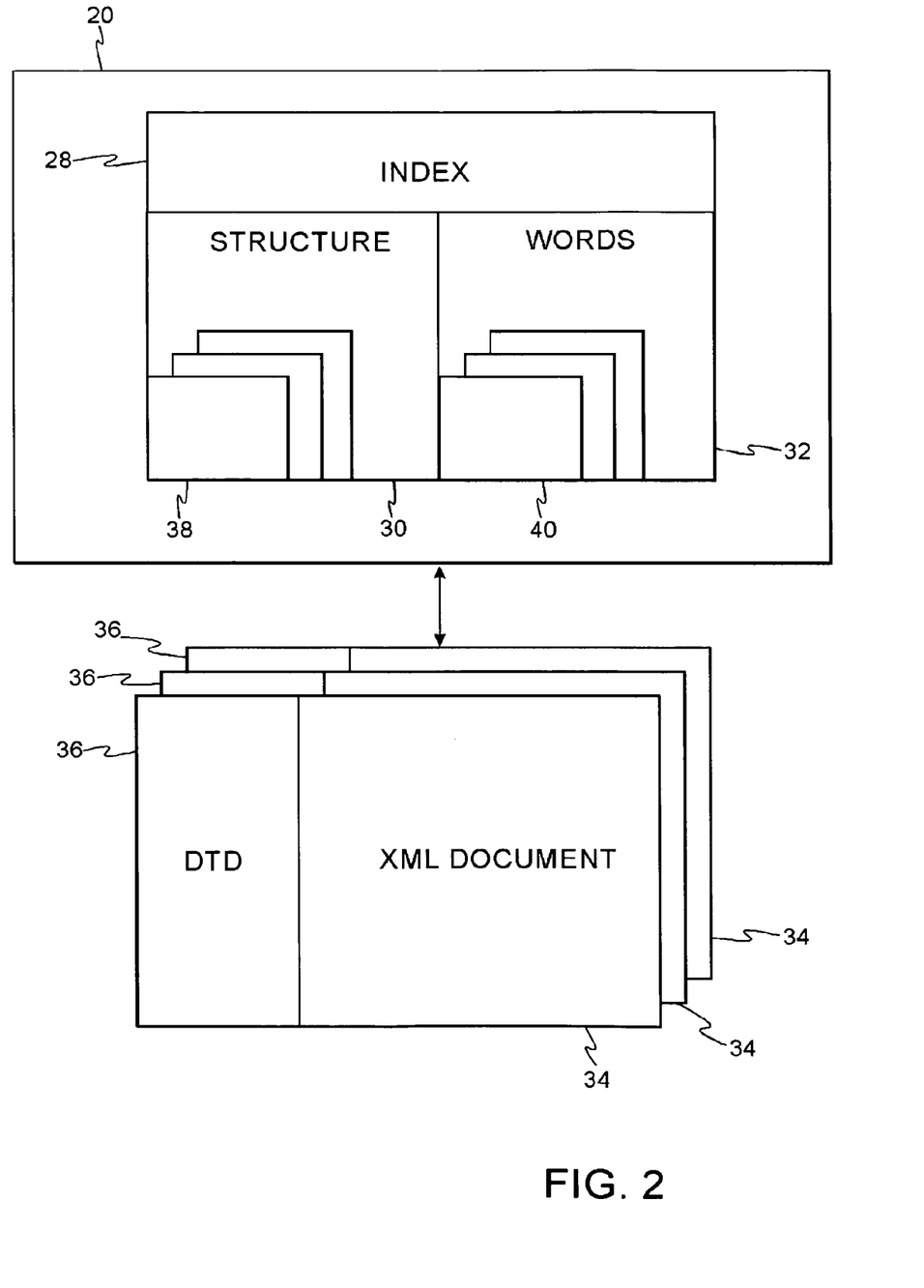
FIG. 2 is a block diagram illustrating aspects of an indexer that is used in the file system shown in FIG. 1.

Reference is now made to FIG. 2, which illustrates aspects of the indexer 20 in further detail. The description of FIG. 2 is to be read in conjunction with FIG. 1. The indexer 20 operates on a multilevel inverted index 28. The index 28 consists of two main portions, a structural section 30, and a words section 32. The structural section 30 is compliant with each underlying structure of each document 34 being indexed, as dictated by its respective DTD 36, and the words section 32 keeps track of all the words which appear as values in each of the documents 34. The structural section 30 maintains a list of postings 38 for each element of the document 34, and the words section 32 maintains a list of postings 40. The postings 38, 40 include a file identification, offset and length, and are accessed from the index 28 when preparing responses to relevant queries.

In implementing additional enhanced functionality in the arrangement 10, the navigational portions of the well-known XPath standard is supported. This is believed to be a logical and practical choice, since XPath is an important standard in the XML community. The XPath standard is disclosed in the document, XML Path Language (XPath), Version 1.0. W3C®, http://www.w3.org/TR/1999/REC-xpath-19991116. Use of the XPath standard has facilitated the objective of reducing the effort of locating specific XML files. Two XPath operators are currently supported: (1) the operator "//", herein referred to as "_desc", which flattens the directory hierarchy, and (2) the operator "*", herein referred to as "_star", which as implemented herein, applies to the directory's immediate children, similar to a "wild card". Thus, the application of the operator _star on a particular directory results in the display of that directory's grandchildren.

A special virtual directory, names _desc, appears in every physical directory that has subdirectories. This directory represents the Xpath operator "//". Once the user attempts to read the contents of this directory the file system engine recognizes the special operator, and rather than reading the actual physical directory on disk, it supplies a semantic response. In the particular case of the operator "//", the response consists of listing all the subdirectories recursively. Moreover, when one such subdirectory is accessed the file system engine recognizes that the special semantic operator appears somewhere along the path and responds accordingly.

As a specific example, assume that the user is operating in a directory named "top" which has a subdirectory named "group", which in turn has a subdirectory named "group". Applying the _desc operator to the directory top, and then reading the contents of the directory group results in the identification of all files contained in both of the subdirectories sharing the name "group", and their display in a combined presentation.

As explained more formally in the above noted XPath standard, the symbol "//" is short for /descendant-or-self:: node( )/. As implemented herein the _desc operator, invoked by the syntax "//", selects all descendants of the context node and presents them in a flat format, which can be a linear list, rather than the conventional hierarchical tree.

For example, the syntax "//olist/item" selects all the "item" elements in the same document as the context node that have an "olist" parent. The syntax */para invokes the operator _star.

In both cases, the information presented to the user represents a flattening of the elements hierarchy of the DTD in question beginning from the element at which the user began. Each such returned element is represented as a directory, which the user can work with as with any conventional directory. For example, the user can read its contents.

The XML-aware file system 14 (FIG. 1) supports a combination of browse and search navigation paradigms. Clients navigate through a directory hierarchy that specifies which content, in which context, is relevant to them at that time. A path to a directory in the XML-aware file system 14 is a sequence of elements and values. The content of the final directory includes all the XML documents that contain the elements and values named in the path in the correct nesting. Thus, a directory path reflects a query for a set of documents matching a set of constraints. The XML-aware file system 14 allows queries to be constructed incrementally. At each stage of the directory structure traversal, the XML-aware file system 14 presents all the valid possibilities from which the user can select, in order to continue narrowing the query. These possibilities may derive from the DTD structure, as well as from the actual document contents. The browse and search paradigms are greatly facilitated by the implementation of the operators _star and _desc.

EXAMPLE 1

Figure 3:
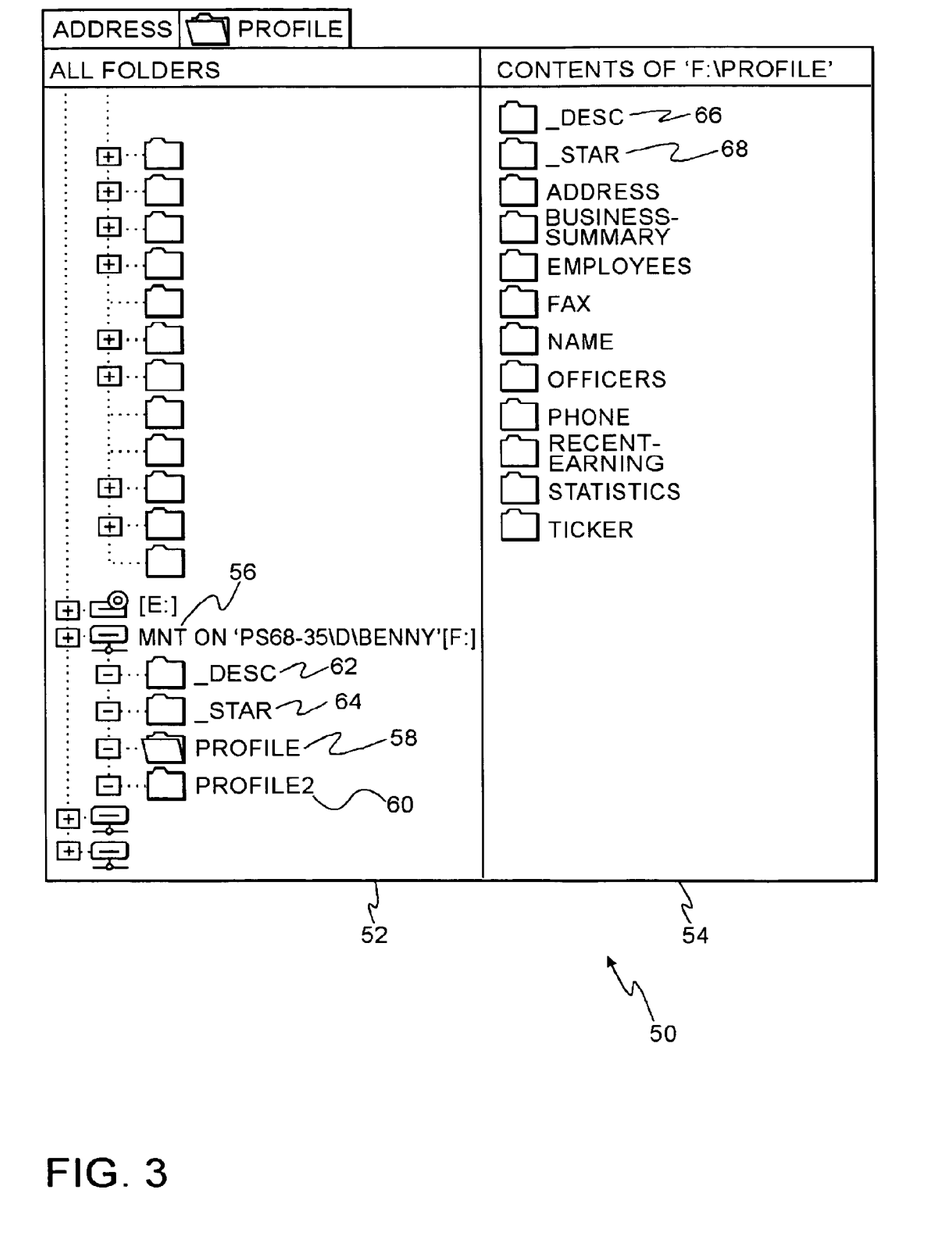
FIG. 3 represents a computer monitor screen display that is generated in accordance with a preferred embodiment of the invention.

Reference is now made to FIG. 3, which represents a computer monitor screen display that is generated in accordance with a preferred embodiment of the invention. The description of FIG. 3 is to be read in conjunction with FIGS. 1 and 2. The arrangement 10 is employed in the following example, which excerpts a session. A user has issued a query that has resulted in the generation of a screen display 50. The screen display 50 includes a left pane 52 and a right pane 54, and represents the relevant portion of the output of the well-known Windows Explorer application of the Microsoft Windows® operating system. The left pane 52 shows a volume 56 "mnt", a directory 58 named "profile", and a directory 60 named "profile2". The left pane 52 also displays a special virtual directory 62, named "_desc", and a special virtual directory 64, named "_star". The right pane 54 shows a first level expansion of the directory 58, and also displays a special virtual directory 66 named "_desc" and a special virtual directory 68 named "_star".

The special virtual directory 66 and the special virtual directory 62 share the same name, but they are not identical. When the special virtual directory 66 is opened, its contents are generated by the application of the operator _desc to the its context node, which is the directory 58. When the special virtual directory 62 is opened, its contents are generated from the application of the operator _desc to its context node, which is the volume 56. The contents of the special virtual directory 62 include attributes and elements of the directory 58 and the directory 60.

The special virtual directory 68 and the special virtual directory 64 share the same name, but they are not identical. When the special virtual directory 68 is opened, its contents are generated by the application of the operator _star to the its context node, which is the directory 58. When the special virtual directory 64 is opened, its contents are generated from the application of the operator _star to its context node, which is the volume 56. The contents of the special virtual directory 62 include attributes and elements of the directory 58 and the directory 60.

Figure 4:
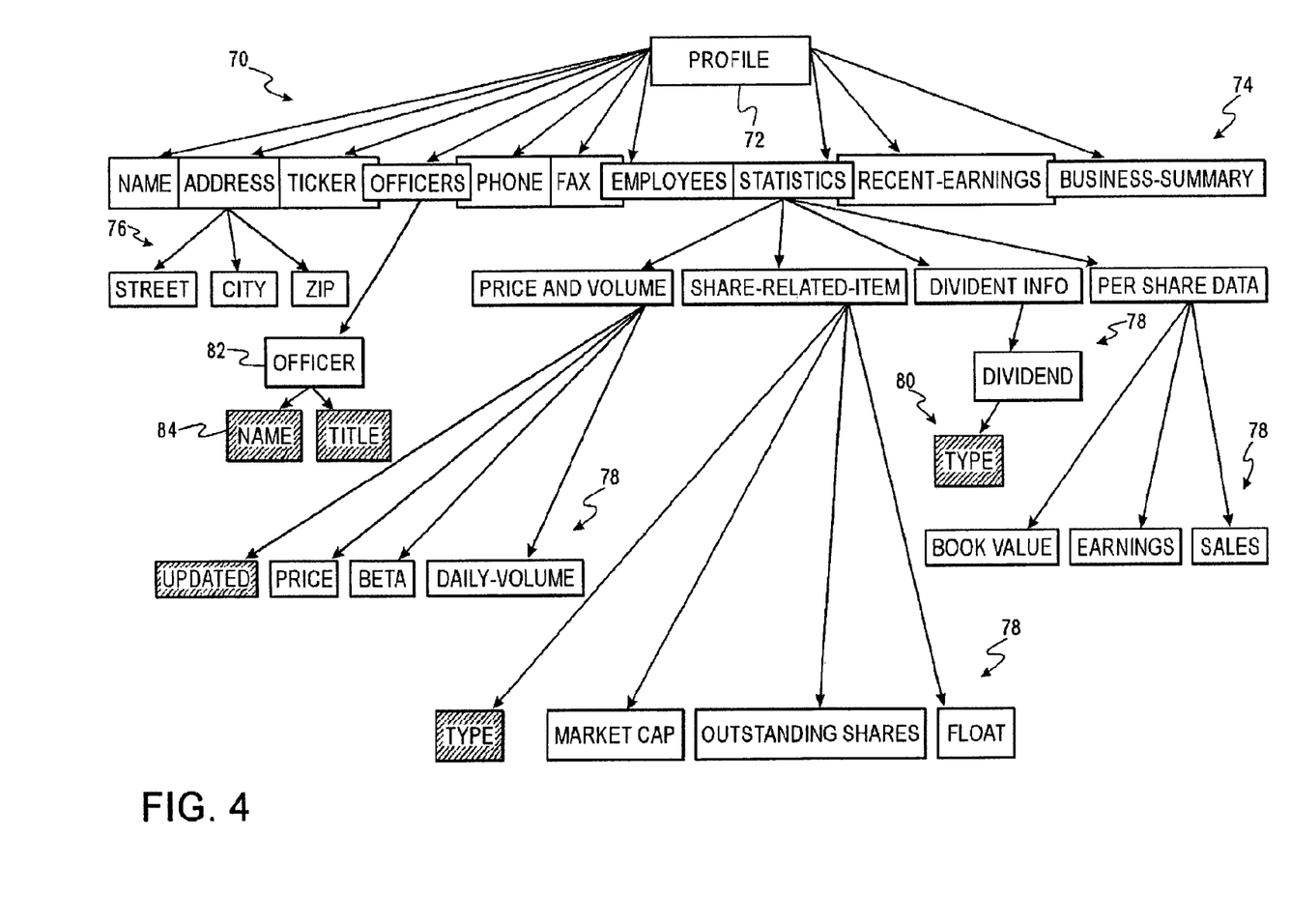
FIG. 4 schematically illustrates a hierarchical expansion of a virtual directory that is shown in FIG. 3.

Reference is now made to FIG. 4, which schematically illustrates a full hierarchical expansion of the directory 58 that would be produced by a conventional file system or the XML-aware file system 14 without the enhancements provided by the operators _desc and _star. The description of FIG. 4 is to be read in conjunction with FIG. 3. In FIG. 4 elements are shown in cross-hatched boxes, and attributes are shown in boxes having a white background. The elements and attributes are collected in the course of the operation of the file system into a single physical directory. The directory is represented in FIG. 4 as a hierarchical tree 70 having a root 72, in which the root 72 corresponds to the directory 58 (FIG. 3). The first level 74 is similar to the presentation in the right pane 54 (FIG. 3), except that the special virtual directory 66 and the special virtual directory 68 are not shown. The hierarchical tree 70 includes a second level 76, and an arbitrary number of more deeply nested levels, of which a third level 78 and a fourth level 80 are shown. The semantic information that is encoded in the hierarchical tree 70 includes elements, for example the element 82 named "Officer". The semantic information also includes attributes of elements, for example the attribute 84 named "name", which is an attribute of the element 82.

The directory 58, as represented by the hierarchical tree 70 of FIG. 4, is a much more concise presentation in response to a context sensitive query than could be afforded by a conventional file system. Nevertheless, it has enough complexity to hinder the user in his search for desired information.

Figure 5:
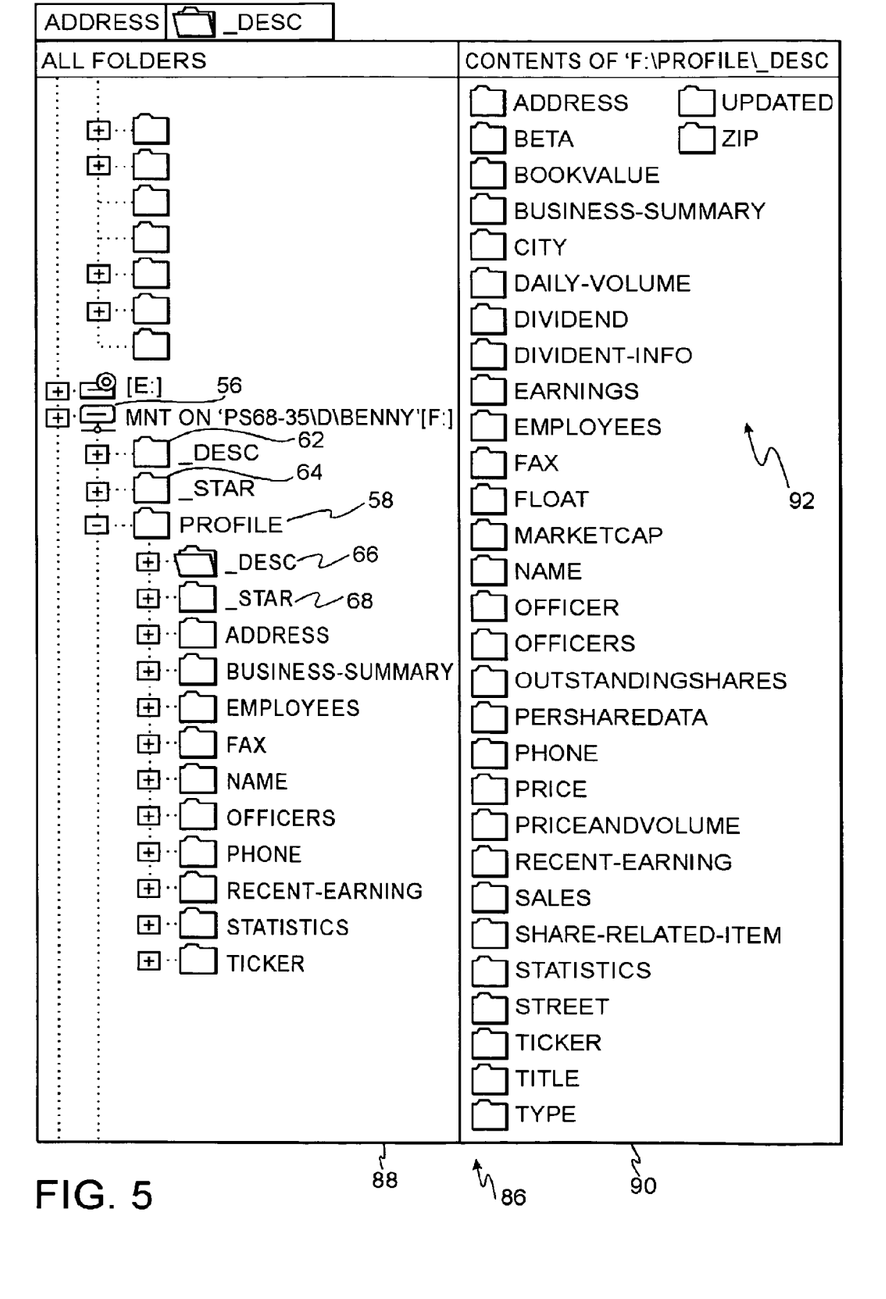
FIG. 5 represents a computer monitor screen display that is generated in accordance with a preferred embodiment of the invention.

Reference is now made to FIG. 5, which represents a computer monitor screen display that is generated in accordance with a preferred embodiment of the invention. The description of FIG. 5 is to be read in conjunction with FIG. 3 and FIG. 4. A screen display 86 includes a left pane 88 and a right pane 90. The left pane 88 shows the directory 58, and its first level expansion, including the special virtual directory 66 and the special virtual directory 68. The right pane 90 displays a wrapped linear list 92, which is the result of stepping into the special virtual directory 66 (FIG. 3), thereby applying the operator _desc to the context node of the special virtual directory 66, which is the directory 58. The linear list 92 includes all the attributes and elements of the hierarchical tree 70 (FIG. 4) in a flat format, except the context node itself. The user thus has the option of viewing the results of a query in a standard format that is presented by the XML-aware file system 14 (FIG. 1) without the enhancements provided by the operator _desc. This is done simply by stepping into the directory 58. The user has the additional option of viewing the results in an alternative presentation by stepping into the special virtual directory 66, and thereby invoking the operator _desc.

EXAMPLE 2

Figure 6:
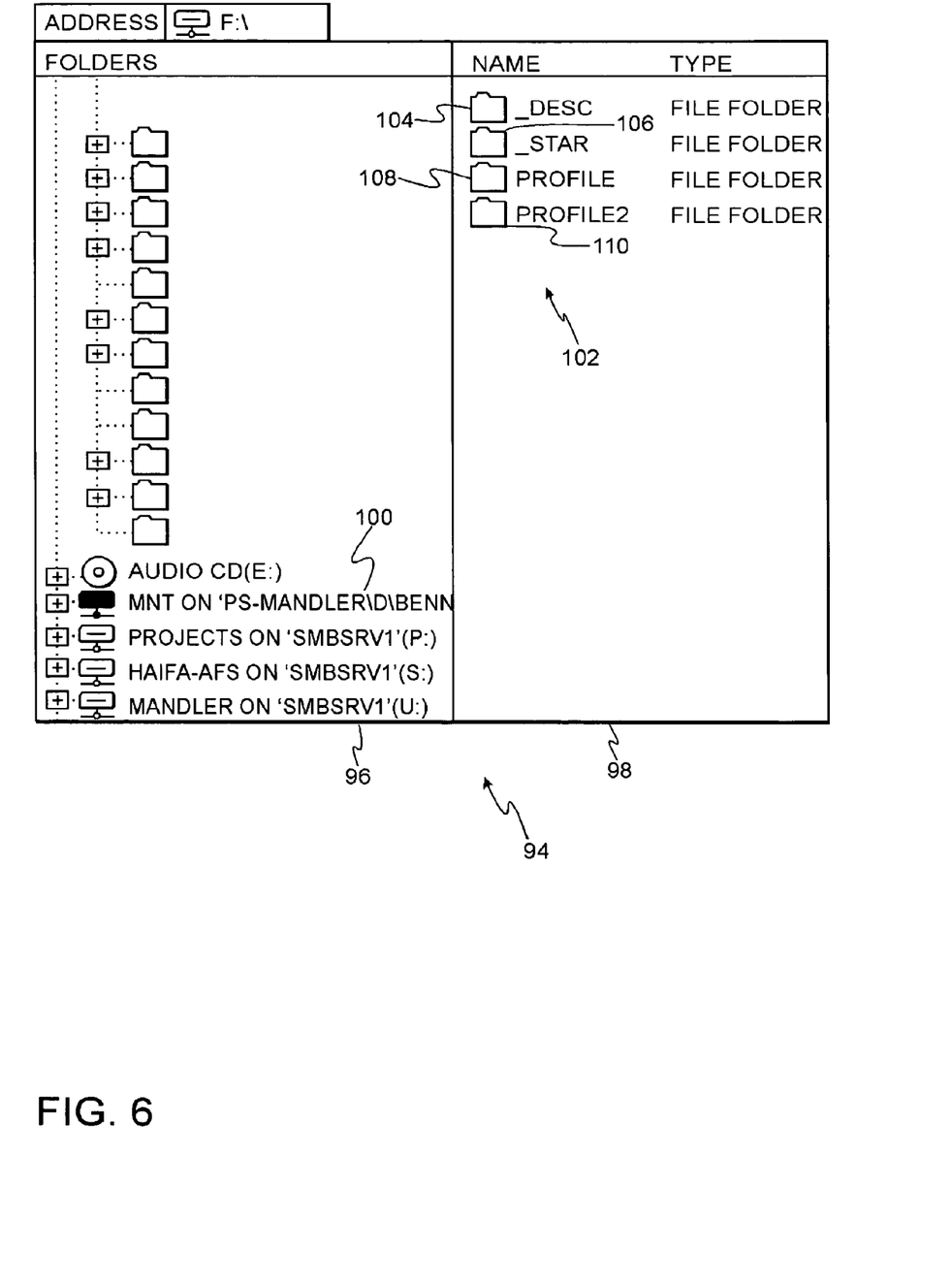
FIG. 6 represents a computer monitor screen display that is generated in accordance with a preferred embodiment of the invention.

Reference is now made to FIG. 6, which represents a computer monitor screen display that is generated in accordance with a preferred embodiment of the invention. A screen display 94 includes a left pane 96 and a right pane 98, and presents the response to a query that is similar to but not identical to that presented in FIG. 3 and FIG. 5. Shown on the left pane 96 is a volume 100, which is expanded on the right pane 98 as a list of elements 102. The elements 102 comprise the special virtual directory 104, named "_desc", the special virtual directory 106, named "_star", the directory 108, named "profile", and the directory 110, named "vrml".

Figure 7:
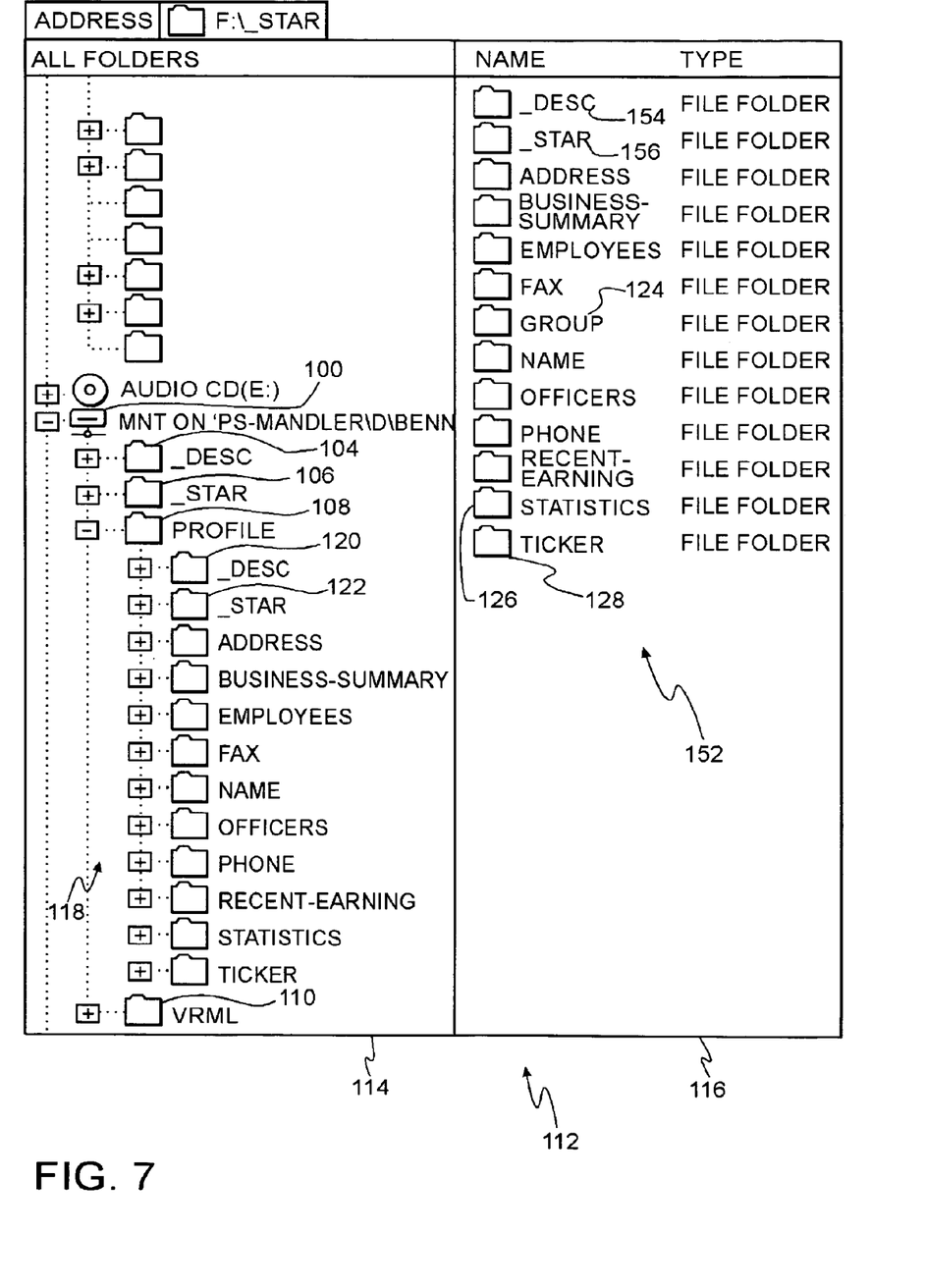
FIG. 7 represents a computer monitor screen display that is generated in accordance with a preferred embodiment of the invention.

Reference is now made to FIG. 7, which represents a computer monitor screen display that is generated in accordance with a preferred embodiment of the invention and is an alternate presentation in response to the query associated with FIG. 6. The description of FIG. 7 is to be read in conjunction with FIG. 6. A screen display 112 includes a left pane 114 and a right pane 116. Shown on the left pane 114 are the volume 100, the special virtual directory 104, named "_desc", the special virtual directory 106, named "_star", and the directory 108. The directory 108 has been opened, and the elements 118 of its first level expansion are shown in the left pane 114, The elements 118 include a special virtual directory 120, named "_desc", and a special virtual directory 122, named "_star". Other elements of the directory 108 are also shown in the left pane 114, including the directory 124, named "group", the directory 126, named "Statistics", and the directory 128, named "ticker". A directory 110, named "vrml", is present.

Figure 8:
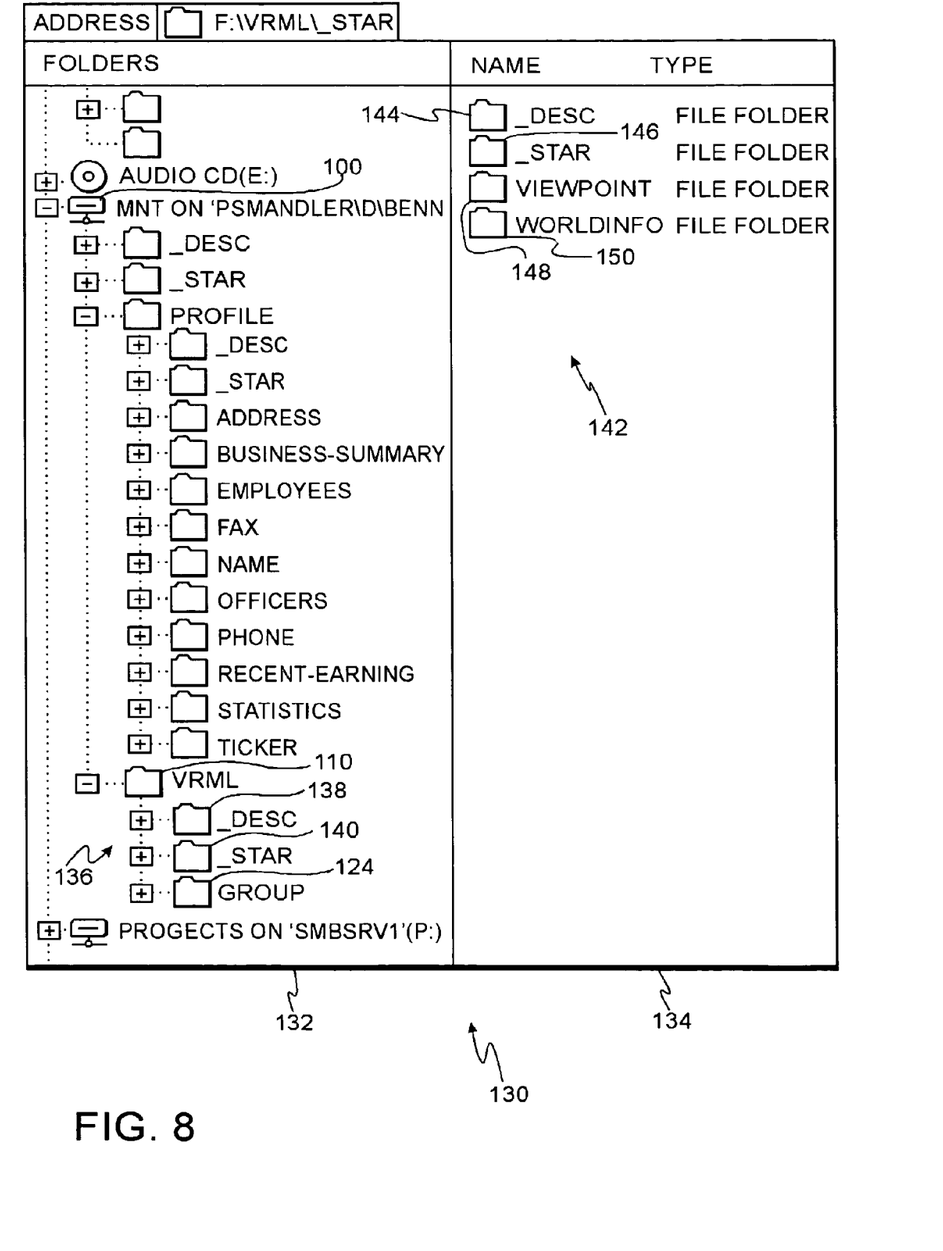
FIG. 8 represents a computer monitor screen display that is generated in accordance with a preferred embodiment of the invention.

Reference is now made to FIG. 8, which represents a computer monitor screen display that is generated in accordance with a preferred embodiment of the invention. The description of FIG. 8 is to be read in conjunction with FIGS. 6 and 7. A screen display 130 includes a left pane 132 and a right pane 134. Shown on the left pane 132 are the volume 100, and the directory 110. The elements 136 of the first level expansion of the directory 110 are shown in the left pane 132, and include the directory 124, a special virtual directory 138, named "_desc", and a special virtual directory 140, named "_star". The special virtual directory 140 has been opened, and the elements 142 of its first level expansion, shown on the right pane 134, include a special virtual directory 144, named "_desc", a special virtual directory 146, named "_star", a directory 148, named "viewpoint", and a directory 150, named "worldinfo". The right pane 134 will be discussed in further detail hereinbelow.

Referring now to FIGS. 7 and 8, the right pane 116 displays the result of stepping into the special virtual directory 104, and thereby invoking the operator _star, which is applied to the volume 100, the context node of the special virtual directory 104. The right pane 116 shows all grandchild elements of the root node of the volume 100 that were generated by the XML-aware file system 14 (FIG. 1). The right pane 116 thus presents a list of elements 152 that are found in the first level expansion of the directory 108 and the first level expansion of the directory 110. Attributes and elements are treated identically by the operators _star and _desc.

The elements 152 presented in the right pane 116 includes directories, of which the directory 126, named "Statistics" and the directory 128, named "ticker" are child elements of the directory 108. The directory 124 is a child element of the directory 110 (see FIG. 8). While not illustrated in FIG. 7, in some embodiments it is possible for the elements displayed by the operator _star to be objects other than directories. This is typically the case when the operator _star produces a display of the most deeply nested level of a directory hierarchy. The right pane 116 presents a special virtual directory 154, named "_desc", and a special virtual directory 156, named "_star".

Figure 9:
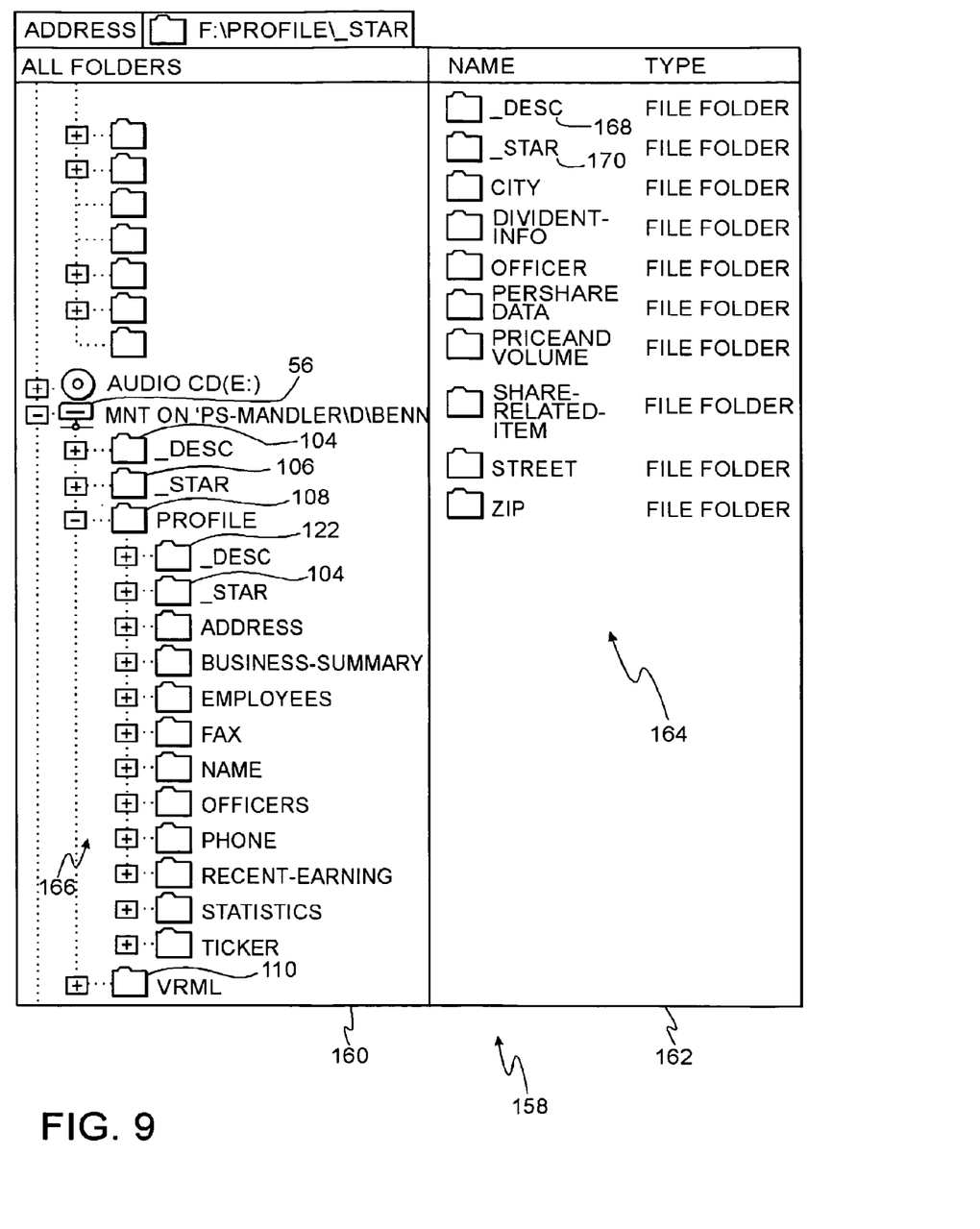
FIG. 9 represents a computer monitor screen display that is generated in accordance with a preferred embodiment of the invention.

Reference is now made to FIG. 9, which represents a computer monitor screen display that is generated in accordance with a preferred embodiment of the invention. The description of FIG. 9 is to be read in conjunction with FIGS. 6, 7, and 8. A screen display 158 includes a left pane 160 and a right pane 162. The left pane 160 is similar to the left pane 114 (FIG. 7), except now the special virtual directory 104 has been opened, and expanded in the right pane 162, thereby invoking the operator _star, which is applied to the context node, the directory 108.

The right pane 162 presents a list of elements 164 that are child elements of the directories 166 and are grandchildren elements of the directory 108. Descendants of the directory 110 are not presented in the right pane 162, because the directory 110 is not an element of the hierarchical tree whose root is the directory 108.

Various ones of the elements 164 could be revealed by expanding the individual directories 166 by one level one-by-one. However, such a procedure would be far more tedious than the invocation of the operator _star, which immediately reveals all the elements 164 in the right pane 162. If further in-depth examination of the hierarchical levels below the directories 166 and the elements 164 were required, the task could easily become completely impractical.

The right pane 162 presents a special virtual directory 168, named "_desc", and a special virtual directory 170, named "_star". Stepping into the special virtual directory 168 or the special virtual directory 170 would apply the operator _desc and the operator _star respectively to all the directories 166 that are displayed on the left pane 114.

Referring again to FIG. 8, the display presented on the right pane 134 represents the application of the operator _star to the directory 110. Thus the directories 148, 150 are child elements of the directory 124, and could be alternatively shown by stepping into the directory 124 directly.

While this invention has been explained with reference to the structure disclosed herein, it is not confined to the details set forth, and this application is intended to cover any modifications and changes as may come within the scope of the following claims:

What is claimed is:

1. A computer implemented information retrieval system for returning a semantically dependent directory structure of files to a user, comprising:
    a file system engine, that receives a file request via a file system application programming interface, wherein said file request specifies a file content of memorized files;
    a parser, linked to said file system engine, that retrieves structural information of documents, said parser further retrieving at least one of elements, attributes and respective values thereof from said documents;
    an indexer, linked to said parser, for constructing an inverted index of said elements and said attributes and said respective values thereof,
    wherein responsive to said file request, said file system engine retrieves postings of said inverted index that satisfy requirements of said file request, and returns a hierarchical tree of directories to said user; and
    wherein said file system engine returns a special virtual directory in each of said directories, wherein a content of said special virtual directory comprises at least one level of said hierarchical tree, said one level being more deeply nested than a level of said special virtual directory in said hierarchical tree.

2. The information retrieval system according to claim 1, wherein said file system engine returns contents of said special virtual directory by invoking an operator, said operator being designated responsively to a name of said special virtual directory, to a context node of a parent of said special virtual directory.

3. The information retrieval system according to claim 2, wherein said file system engine returns contents of said special virtual directory by parsing said name of said special virtual directory, translating said name of said special virtual directory into a query and responding to said query using said inverted index.

4. The information retrieval system of claim 1, wherein said inverted index comprises a structural section having postings of said structural information, and a words section having postings of words of said documents.

5. The information retrieval system of claim 1, further comprising an analyzer for updating said inverted index, wherein said analyzer analyzes additions to said memorized files.

6. The information retrieval system of claim 1, wherein said parser retrieves said structural information from said documents.

7. A computer implemented information retrieval system for returning a semantically dependent directory structure of XML files to a user, comprising:
    a file system engine, that receives a file request via a file system application programming interface, wherein said file request specifies a file content of memorized files;
    an XML parser, linked to said file system engine, that retrieves structural information of XML documents, said XML parser further retrieving at least one of elements, attributes and respective values thereof from said XML documents;
    an indexer, linked to said XML parser, for constructing an inverted index of said elements and said attributes and said respective values thereof,
    wherein responsive to said file request, said file system engine retrieves postings of said inverted index that satisfy requirements of said file request, and returns a hierarchical tree of directories to said user; and
    wherein said file system engine returns a special virtual directory in each of said directories, wherein a content of said special virtual directory comprises at least one level of said hierarchical tree, said one level being more deeply nested than a level of said special virtual directory in said hierarchical tree.

8. The information retrieval system according to claim 7, wherein said file system engine returns contents of said special virtual directory by invoking an operator, said operator being designated responsively to a name of said special virtual directory, to a context node of a parent of said special virtual directory.

9. The information retrieval system according to claim 8, wherein said file system engine returns contents of said special virtual directory by parsing said name of said special virtual directory, translating said name of said special virtual directory into a query and responding to said query using said inverted index.

10. The information retrieval system of claim 7, wherein said inverted index comprises a structural section having postings of said structural information, and a words section having postings of words of said XML documents.

11. The information retrieval system of claim 7, further comprising an XML analyzer for updating said inverted index, wherein said XML analyzer analyzes additions to said memorized files.

12. The information retrieval system of claim 7, wherein said XML parser retrieves said structural information from said XML documents.

* * * * *